United States Patent [19]

Sugita et al.

[11] Patent Number: 5,298,282

[45] Date of Patent: Mar. 29, 1994

[54] PRODUCTION OF MAGNETIC RECORDING MEDIUM

[75] Inventors: Ryuji Sugita; Kiyokazu Tohma, both of Hirakata; Tatsuaki Ishida, Sakai, all of Japan

[73] Assignee: Matsushita Electric Industrial Co., Ltd., Kadoma, Japan

[21] Appl. No.: 93,748

[22] Filed: Jul. 20, 1993

[30] Foreign Application Priority Data

Jul. 24, 1992 [JP]  Japan .................................. 4-198589
Sep. 9, 1992 [JP]  Japan .................................. 4-240537

[51] Int. Cl.$^5$ .............................................. B05D 5/12
[52] U.S. Cl. .................................. 427/131; 427/132; 427/296; 427/255.3; 427/255.7; 427/257
[58] Field of Search ................ 427/131, 132, 296, 257, 427/255.3, 255.7

[56] References Cited

U.S. PATENT DOCUMENTS 5,122,392  6/1992  Takeuchi et al. .................... 427/129

FOREIGN PATENT DOCUMENTS 64-014726  1/1989  Japan .
01-264632  10/1989  Japan .
03-003118  1/1991  Japan .
03-280219  12/1991  Japan .
04-155623  5/1992  Japan .

Primary Examiner—Bernard D. Pianalto
Attorney, Agent, or Firm—Wenderoth, Lind & Ponack

[57] ABSTRACT

A method for producing a magnetic recording medium having a magnetic layer having a two-layered structure positioned on a substrate, which includes forming the magnetic layer on the substrate by a vacuum deposition process during the travel of the substrate on a cylindrical can, wherein a first evaporation source and a second evaporation source are positioned on the same side of a vertical line passing across a longitudinal axis of the cylindrical can while confronting the cylindrical can, a shield plate having a first opening and a second opening is positioned between the cylindrical can and the first and second evaporation sources, each of vapors evaporated from the first and second evaporation sources passes through the first and second openings, respectively, a distance between the vertical line passing across the longitudinal axis of the cylindrical can and a center of an evaporation part of the first evaporation source is longer than a radius of the cylindrical can, and a distance between the vertical line passing across the longitudinal axis of the cylindrical can and a center of an evaporation part of the second evaporation source is shorter than a radius of the cylindrical can.

5 Claims, 3 Drawing Sheets

PRODUCTION OF MAGNETIC RECORDING MEDIUM

BACKGROUND OF THE INVENTION

1. Field of the Invention

The present invention relates to a method for producing a magnetic recording medium comprising a two-layered magnetic layer and having an excellent high density recording property.

2. Description of Related Art

As a recording density of a magnetic recording/reproducing equipment has been increased year by year, it is highly desired to provide a magnetic recording medium which is excellent in recording and reproducing characteristics in a short wavelength range. Today, a coating type magnetic recording medium in which magnetic powder is coated on a substrate is mainly used, and its properties are being improved to satisfy the above desire. However, the improvement of the properties is nearing its limit.

One of magnetic recording media which can exceed this limit is a thin film magnetic recording medium. The thin film magnetic recording medium is produced by a vacuum deposition method, a sputtering method or a plating method and has excellent recording and reproducing characteristics in a short wavelength range. Examples of magnetic materials used in the thin film magnetic recording medium are Co, Co-Ni, Co-Ni-P, CO-O, CO-Ni-O, Co-Cr, Co-Ni-Cr, Co-Cr-Ta, Co-Cr-Pt and the like.

It is supposed that Co-O and Co-Ni-O are most suitable for the practical use as the magnetic recording tape, and a deposition cape comprising a Co-Ni-O magnetic layer is already practically used as a Hi-8 type video tape. A magnetic property of an oxygen-containing magnetic layer widely varies depending on an amount of supplied oxygen at the deposition. One embodiment of the production method of a deposition Hi-8 type video tape will be explained by making reference to FIG. 1.

FIG. 1 schematically illustrates an inner structure of a vacuum deposition apparatus conventionally used for producing the deposition Hi-8 type video tape. A substrate 1 made of a polymer film travels around a peripheral surface of a cylindrical can 4 in a direction of an arrow A. A vapor 3 of a raw magnetic material 6 is evaporated from an evaporation source 5 receiving the raw material 6, and is deposited on the substrate 1 to form a magnetic layer on the substrate 1. As the evaporation source 5, an electron beam evaporation source is preferred, and the raw material 6 such as a metal, for example, CO and an alloy, for example, Co-Ni is filled in the evaporation source S. The reason why the electron beam evaporation source is used is that it can evaporate a high melting point metal such as Co at a high evaporation rate.

Below a part of the circumference of the cylindrical can 4, there is provided a shielding plate 8 which prevents excessive deposition of the evaporated atoms on the substrate.

An oxygen gas is supplied in a vacuum chamber from nozzle 9 positioned near the end of shielding plate 8 during the vapor deposition o-f the evaporated atoms on the substrate. The optimization of the position of the nozzle 9 and the amount of the supplied oxygen gives a deposition tape having an excellent recording/reproducing property and excellent practicability. The substrate 1 is unwound from the supply roll 2 and, after the formation of the magnetic layer, is wound on the wind-up roll 3.

In future, the magnetic tape will be required to have a higher output and a lower noise in a short wave length range. As one of methods to satisfy this requirement, it is thought to use a magnetic layer having a two-layered structure.

However, when the vacuum deposition apparatus shown in FIG. 1 is used to form a magnetic layer having a two-layered structure, a step comprising depositing the magnetic layer on the substrate during the travel of the substrate 1 must be conducted twice. When the conventional method is used to form the magnetic layer having the two-layered structure by only one travel of the substrate, it is necessary to use a vacuum deposition apparatus equipped with two cylindrical cans. When these methods are used to form the magnetic layer, the recording/reproducing property is improved but any of these methods requires a high cost.

SUMMARY OF THE INVENTION

One object of the present invention is to solve the above problems, and to provide a method for producing a magnetic recording medium comprising a magnetic layer having a two-layered structure with a low production cost.

The present invention provides a method for producing a magnetic recording medium having a magnetic layer having a two-layered structure positioned on a substrate, which comprises forming the magnetic layer on the substrate by a vacuum deposition process during the travel of the substrate on a cylindrical can, wherein a first evaporation source and a second evaporation source are positioned on the same side of a vertical line passing across a longitudinal axis of the cylindrical can while confronting the cylindrical can, a shield plate having a first opening and a second opening is positioned between the cylindrical can and the first and second evaporation sources, each of vapors evaporated from the first and second evaporation sources passes through the first and second openings, respectively, a distance between the vertical line passing across the longitudinal axis of the cylindrical can and a center of an evaporation part of the first evaporation source is longer than a radius of the cylindrical can, and a distance between the vertical line passing across the longitudinal axis of the cylindrical can and a center of an evaporation part of the second evaporation source is shorter than a radius of the cylindrical can.

According to the present invention, the magnetic recording medium having an improved recording/reproducing property can be produced without remarkable increase of the production cost, since only one cylindrical can and only one travel of the substrate are necessary for depositing the magnetic layer having the two-layered structure.

DETAILED DESCRIPTION OF THE INVENTION

The present invention is explained with reference to the accompanied drawings.

Figure 2:
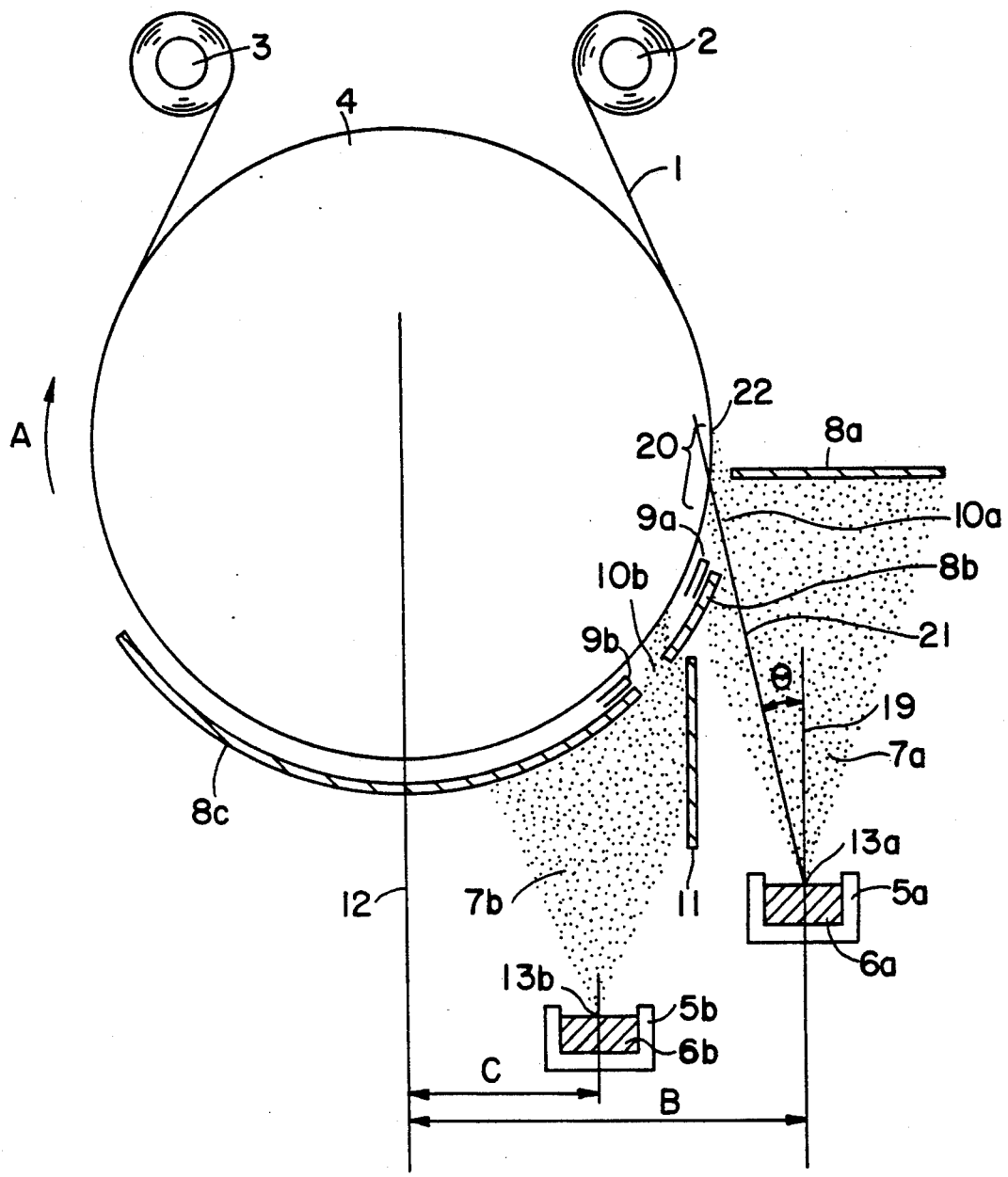
FIG. 2 is a schematic cross-sectional view of one embodiment of an internal structure of a vacuum deposition apparatus for producing a magnetic recording medium according to the present invention.

FIG. 2 is a schematic cross-sectional view of one embodiment of an internal structure of a vacuum deposition apparatus according to the present invention.

A substrate 1 made of, for example, a polymer and wound on a supply roll 2 travels around a cylindrical can 4 in a direction of an arrow A, and is wound on a wind-up roll 3. Two evaporation sources 5a and 5b are positioned. Shielding plates 8a, 8b and 8c are positioned between the evaporation sources 5a and 5b and the cylindrical can 4 so as to prevent an unnecessary material in vapors 7a and 7b from depositing on the substrate 1. There are provided openings 10a and 10b between the shielding plates 8a and 8b and between the shielding plates 8b and 8c so that desired atoms in vapors 7a and 7b evaporated from the vapor sources 5a and 5b pass through the openings 10a and 10b to deposit on the substrate 1. Namely, the vapor 7a evaporating from the evaporation source 5a passes through the opening 10a between the shielding plates 8a and 8b to deposit on the substrate 1. The vapor 7b evaporating from the evaporation source 5b passes through the opening 10b between the shielding plates 8b and 8c to deposit on the substrate 1. A shielding plate 11 is provided between the openings 10a and 10b so as to prevent the mixing of the vapor 7a with the vapor 7b. Raw materials 6a and 6b are filled in the evaporation sources 5a and 5b, respectively.

The evaporation source 5a constitutes the first evaporation source, the evaporation source 5b constitutes the second evaporation source, the opening 10a constitutes the first opening, the opening 10b constitutes the second opening, and the shielding plates 8a, 8b and 8c constitute the plate having the first and second openings.

The evaporation sources 5a and 5b are positioned so that they are on the same side of a vertical line 12 passing across the longitudinal axis of the cylindrical can 4, a distance B between the vertical line 12 passing across the longitudinal axis of the cylindrical can 4 and a center 13a of an evaporation part of the evaporation source 5a positioned near a position at which the magnetic layer formation is initiated is longer than a radius of the cylindrical can 4, and a distance C between the vertical line 12 passing across the longitudinal axis of the cylindrical can 4 and a center 13b of an evaporation part of the evaporation source 5b positioned near a position at which the magnetic layer formation is terminated is shorter than the radius of the cylindrical can 4. The above position is introduced with considering various conditions such as (1) that the vapor must impinge on a surface of the the substrate 1 at an angle as small as possible between the vapor and the substrate 1 so as to give a high SIN ratio, (2) that the opening had better be positioned just above the evaporation part so as to give a high film forming speed, and (3) that a distance between the evaporation sources is limited because of the size of the apparatus.

The substrate travels under the above construction so that one travel of the substrate can form the magnetic layer having the two-layered structure at a high speed of the substrate travel by forming the magnetic layer with evaporating the vapors 7a and 7b from both of evaporation sources 5a and 5b.

When the positions of the evaporation sources 5a and 5b are not as defined above, for example, when both of the distance B between the the vertical line 12 passing across the longitudinal axis of the cylindrical can 4 and the center 13a of the evaporation part of the evaporation source 5a positioned near the position initiating the magnetic layer formation and the distance C between the vertical line 12 passing across the longitudinal axis of the cylindrical can 4 and the center 13b of the evaporation part of the evaporation source 5b positioned near the position terminating the magnetic layer formation are shorter than the radius of the cylindrical can 4 (in this case, the distance C must be shorter than the above so as to maintain a distance between the evaporation sources 5a and 5b), at least one of the high S/N ratio and the high speed of substrate travel is not achieved. In the case that it is desired to obtain the magnetic recording medium having the high S/N ratio, when the opening 10b is positioned in the same position, then the opening 10b is remarkably separated from the vertical line passing across the center 13b of the evaporation part, the vapor density in the opening 10b is low and the formation speed of the magnetic layer formed by the vapor 7b passing through the opening 10b is low so that the substrate travel speed cannot be high.

When the positions of openings 10a and 10b are changed to increase the substrate travel speed, an angle between the direction of impingement of the vapor to the substrate and a line normal to the substrate is decreased so that the magnetic recording medium having the high SIN ratio cannot be obtained. In contrast, according to the construction of the present invention, in the state that the openings 10a and 10b are set under so conditions that the high SIN ratio is obtained, the film forming speeds of the two thin layers formed from the vapors 7a and 7b passing though the openings 10a and 10b are maintained at almost the same level, and the film forming speeds can be increased to give the high speed of the substrate travel.

Figure 1:
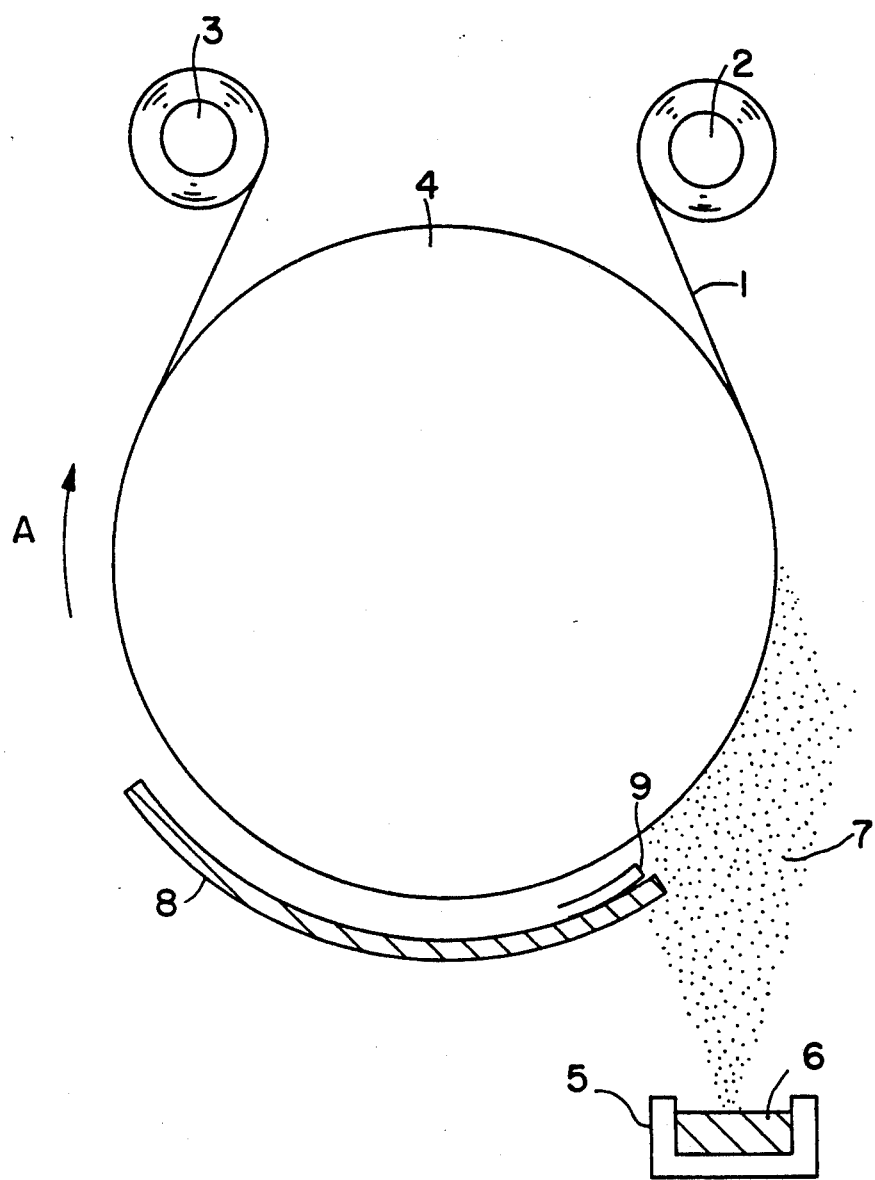
FIG. 1 is a schematic cross-sectional view of an internal structure of a prior art vacuum deposition apparatus for producing a magnetic recording medium.

When the evaporation sources 5a and 5b are positioned on the same side of the vertical line 12 passing across the longitudinal axis of the cylindrical can 4, the high S/N ratio can be obtained. When the vapor sources 5a and 5b are positioned in the opposite sides of the vertical line 12 (in FIG. 1, the evaporation source 5a is positioned on the right side of the vertical line 12 and the evaporation source 5b is positioned on the left side of the vertical line 12.), the high S/N ratio cannot be obtained. In order to obtain the high SIN ratio, the positions of the openings 10a and 10b and the positions of the evaporation sources 5a and 5b are chosen so that direction of the incidence of the vapor on the substrate slants at 40° or higher from the line normal to the substrate.

In order to obtain the higher SIN ratio, an angle $\theta$ between a line 19 normal to liquid surface of the raw material 6a passing across the center 13a of evaporation part of the first evaporation source 5a and a line 21 linking the the center 13a of the evaporation part of the first evaporation source 5a with a location on the substrate 1 in the range 20 in which the magnetic layer is formed by the first evaporation source 5a must be minimized at a position 22 initiating the magnetic layer formation. The reason therefor is that, in order to obtain the high SIN ratio of the magnetic layer formed by the oblique deposition, it is essential to improve the magnetic property of the magnetic layer on the substrate 1, which is deposited near the position 22 initiating the magnetic layer formation and, to this end, it is necessary to increase the vapor density at the position 22 initiating the magnetic layer formation. The density of the vapor evaporated from the evaporation source is highest in the direction normal to the liquid surface of the raw material. In the direction slanting from the direction normal to the liquid surface, the more a slanting angle is, the less the density, of the vapor is. Namely, by minimizing the angle $\theta$ at the position 22 initiating the magnetic layer formation, the density of the vapor at the position initiating the magnetic layer formation can be increased so that the high SIN ratio can be achieved.

According to the above method, the magnetic tape having the excellent recording/reproducing property can be obtained by forming the magnetic layer having two-layered structure with using Co, Co-Ni, Co-Cr, Co-Ni-Cr, Co-Fe, Co-Ni-Fe and the like as the raw material.

In the case that Co, CO-NI, Co-Fe, Co-Ni-Fe and the like are used as the raw material, when the deposition is conducted in the oxygen atmosphere, the magnetic layer is a partial oxide so that the recording/reproducing property and the practicability are improved. In this case, the procedure for supplying oxygen in a vacuum chamber gives a remarkable effect on the recording/reproducing property.

The procedure for supplying oxygen which gives the excellent recording/reproducing property i-n the present invention is explained hereinafter. In FIG. 2, the apparatus has oxygen supply nozzles 9a and 9b. The oxygen supply nozzle 9a is positioned at the end of the shielding plate 8b, facing the vapor 7a. The oxygen supply nozzle 9b is positioned at the end of the shielding plate 8c, facing the vapor 7b. Oxygen from the oxygen supply nozzles 9a and 9b is injected in a direction opposite to the substrate travel direction. Namely, oxygen is injected from the oxygen supply nozzle 9a toward the vapor 7a in the direction opposite to the substrate travel direction. Oxygen is injected from the oxygen supply nozzle 9b toward the vapor 7b in the direction opposite to the substrate travel direction. The main reason why the excellent recording/reproducing property is obtained by using the above construction is supposed to be that the coercive force of the magnetic layer is highest.

In the above, the embodiment was explained in which the magnetic layer having two-layered structure is directly formed on the substrate made of the polymeric material. In the above embodiment, the incident angle between the direction of impingement of vapor to the substrate and the line normal to the substrate surface should be at least 40° so as to obtain the high S/N ratio. However, when the large incident angle of vapor to the substrate and the two-layered structure are merely used, the magnetic recording medium having the stably high SIN ratio cannot be disadvantageously obtained. We extensively studied to solve this disadvantage and found that this disadvantage is sufficiently solved by forming an under layer on the substrate and then forming the magnetic layer on the under layer.

However, when the vacuum deposition apparatus of FIG. 2 is used to form the under layer on the substrate and the magnetic layer having two-layered structure on the under layer, a process conducting the deposition with the travel of the substrate must be performed once more. Alternatively in order to form the under layer and the magnetic layer with one travel of the substrate, it is necessary to use a vacuum deposition apparatus equipped with two cylindrical cans. The above methods for forming the magnetic layer stably give the magnetic recording medium having the high SIN ratio, but any of the above methods gives the increase of production cost.

Accordingly, it is necessary to provide a preparation method for forming the under layer and the magnetic layer having two-layered structure with increasing the cost in a degree as low as possible.

Figure 3:
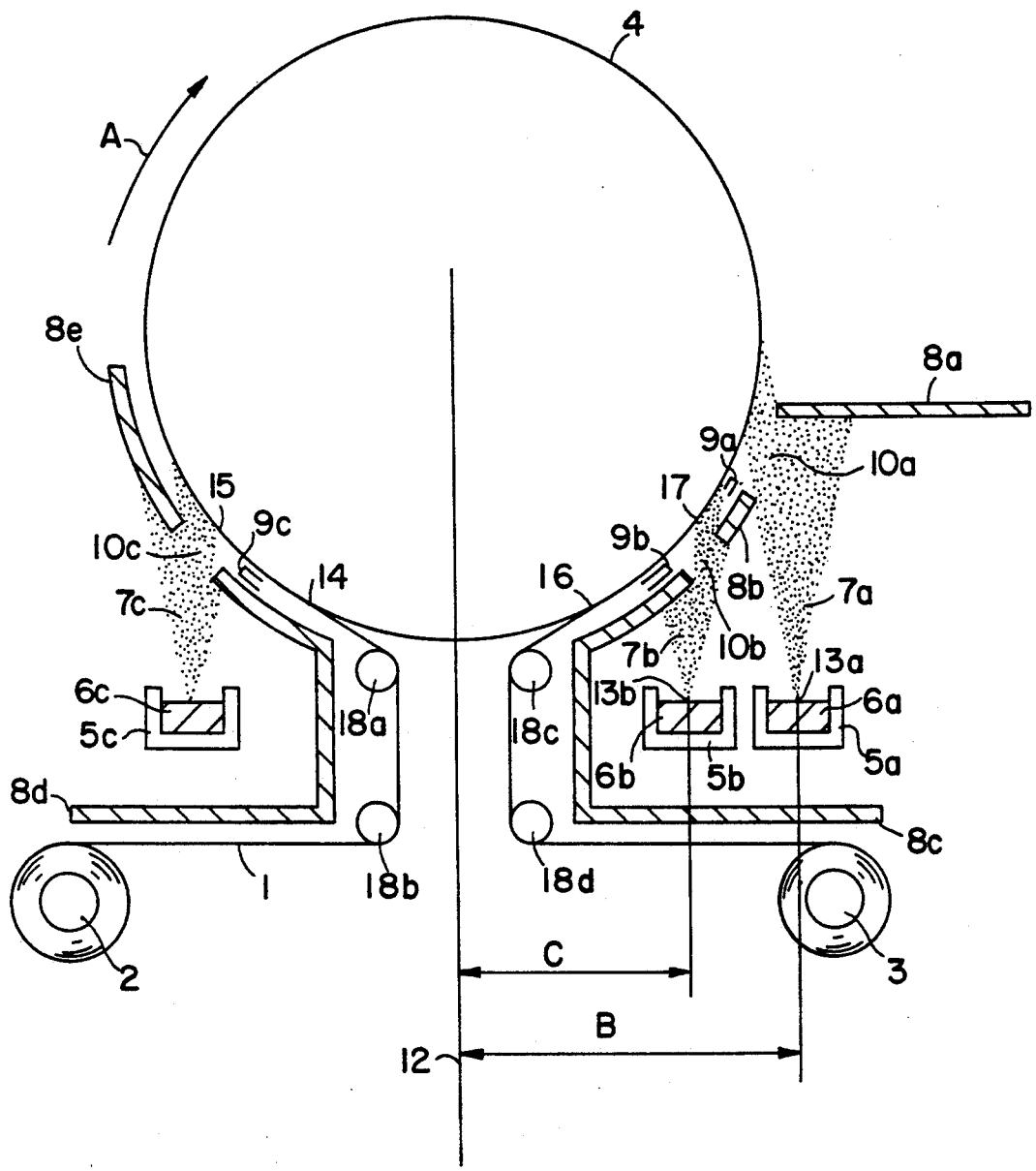
FIG. 3 is a schematic cross-sectional view of another embodiment of an internal structure of a vacuum deposition apparatus for producing a magnetic recording medium according to the present invention.

The production method satisfying the above necessity is explained with reference to FIG. 3. FIG. 3 schematically shows a cross-sectional view of an internal structure of a vacuum deposition apparatus for conducting the production method satisfying the above necessity. When the magnetic layer is formed by the vacuum deposition method on a substrate 1 traveling on the peripheral of a cylindrical can 4, a third evaporation source 5c for forming an under layer is positioned on one side, first and second evaporation sources 5a and 5b for forming a magnetic layer having a two-layered structure are positioned on another side of a vertical line 12 passing across the longitudinal axis of the cylindrical can 4, a position 14 at which the substrate 1 initiates the contact with the cylindrical can 4 is positioned below a deposition initiating position 15, and a position 16 at which the substrate 1 terminates the contact with the cylindrical can 4 is positioned below a deposition terminating position 17.

FIG. 3 is explained in detail hereinafter. The substrate 1 made of polymeric material travels around the cylindrical can 4 in a direction of an arrow A. The third evaporation source 5c for the under layer is positioned on the left side of the vertical line 12 passing across the longitudinal axis of the cylindrical can 4, and the first and second evaporation sources 5a and 5b for the magnetic layer having the two-layered structure are positioned on the right side of the vertical line 12 passing across the longitudinal axis of the cylindrical can 4.

Shielding plates 8a, 8b, 8c, 8d and 8e are positioned between the cylindrical can 4 and the evaporation sources 5a, 5b and 5c, so as to prevent the deposition of unnecessary vapor. Between the shielding plates 8a and 8b, between the shielding plates 8b and 8c and between the shielding plates 8d and 8e, there are openings 10a, 10b and 10c through which the vapor passes to deposit on the substrate. Namely, a vapor 7c evaporates from the third evaporation source 5c for the under layer, passes through the opening 10c between the shielding plates 8d and 8e and deposits on the substrate 1 to form the under layer. A vapor 7a evaporates from the first evaporation source 5a for the magnetic layer, passes through the opening 10a between the shielding plates 8a and 8b and deposits on the substrate 1, and a vapor 7b evaporates from the second evaporation source 5b for the magnetic layer, passes through the opening 10b between the shielding plates 8b and 8c and deposits on the substrate 1 so as to form the magnetic layer having the two-layered structure. Raw materials 6a, 6b and 6c are filled in the evaporation sources 5a, 5b and 5c, respectively. Oxygen supply nozzles 9a, 9b and 9c supply oxygen to the vacuum chamber during the deposition. Free rolls 18a, 18b, 18c and 18d control the travel of the substrate 1. The substrate 1 is unwound from a supply roll 2, travels on the cylindrical can 4 and is wound on a windup roll 3. A distance B between the vertical line 12 passing across the longitudinal axis of the cylindrical can 4 and a center 13a of an evaporation part of the evaporation source 5a positioned near a position at which the magnetic layer formation is initiated is longer than a radius of the cylindrical can 4, and a distance C between the vertical line 12 passing across the longitudinal axis of the cylindrical can 4 and a center 13b of an evaporation part of the evaporation source 5b positioned near a position at which the magnetic layer formation is terminated is shorter than the radius of the cylindrical can 4.

The evaporation sources 5a, 5b and 5c are positioned as follows. The third evaporation source 5c is positioned on the left side and the first and second evaporation sources 5a and 5b are positioned on the right side of the vertical line 12 passing across the longitudinal axis of the cylindrical can 4. In addition, the position 14 at which the substrate 1 initiates the contact with the cylindrical can 4 is positioned below the deposition initiating position 15, and the position 16 at which the substrate 1 terminates the contact with the cylindrical can 4 is positioned below the deposition terminating position 17.

When, according to the above construction, the substrate travels, the vapor 7c for the under layer is evaporated from the third evaporation source 5c, the vapors 7a and 7b for the magnetic layer having the two-layered structure are evaporated from the first and second evaporation sources 5a and 5b to produce the recording magnetic medium, then the under layer and the magnetic layer having two-layered structure can be formed with one travel of the substrate.

PREFERRED EMBODIMENT OF THE INVENTION

The present invention will be illustrated by the following Examples, in which the deposition tape produced according to the present invention is compared with the deposition tape produced according to the prior art method.

EXAMPLE 1

Using the vacuum deposition apparatus as shown in FIG. 2, the deposition magnetic tape was produced. A diameter of the cylindrical can 4 was 1.5 m, and a polyethylene terephthalate film having a thickness of 7 $\mu$m was used as the substrate 1. Co was used as the raw materials 6a and 6b. The distance B between the center 13a of the evaporation part of the evaporation source 5a and the the vertical line 12 passing across the longitudinal axis of the cylindrical can 4 was 85 cm, and the distance C between the center 13b of the evaporation part of the evaporation source 5b and the vertical line 12 passing across the longitudinal axis of the cylindrical can 4 was 60 cm. The shielding plates 8a, 8b and 8c are positioned so that an incident angle between the line normal to the substrate and the direction of the vapor 7a passing through the opening 10a and impinged to the substrate was from 80° to 60° and an incident angle between the line normal to the substrate and the direction of the vapor 7b passing through the opening 10b and impinged to the substrate was from 80° to 60°. The magnetic layer having a whole thickness of 0.15 $\mu$m was formed at an average film deposition rate of 0.3 $\mu$m/sec. Thicknesses of the films formed by the vapors 7a and 7b were 0.08 $\mu$m and 0.07 $\mu$m, respectively. Oxygen was supplied from each of the oxygen supply nozzles 9a and 9b at the rate of 0.5 L/min.

The resultant medium was slit into the tapes. The recording/reproducing property of the tape was evaluated by using a ring type magnetic head comprising Sendust having a gap length of 0.15 $\mu$m. The reproduction outputs of the resultant tape were higher by 3 dB at the recording wavelength of 3.8 $\mu$m, by 6 dB at the recording wavelength of 0.54 $\mu$m and by 8 dB at the recording wavelength of 0.38 $\mu$m than a commercial Hi-8 type deposition video tape produced by the prior art method. The noise of the resultant tape was lower by about 2 dB than the commercial Hi-8 type deposition video tape.

The magnetic tape produced according to the method of the present invention has higher reproduction output and lower noise than the prior art deposition tape. Namely, high SIN ratio can be obtained. The productivity is high since only one travel of the substrate gives the magnetic tape. The traveling system of the vacuum deposition apparatus is not complex since only one cylindrical can is required for the deposition. While two evaporation sources are required, the production cost does not significantly increase, because the speed of the substrate travel can be increased during the deposition because of the increase of the number of the evaporation sources. In this Example, the speed of the substrate travel was 120 m/min.

EXAMPLE 2

When both of the distance between the center 13a of the evaporating part of the evaporation source 5a and the vertical line 12 passing across the longitudinal axis of the cylindrical can 4 and the distance between the center 13b of the evaporating part of the evaporation source 5b and the vertical line 12 passing across the longitudinal axis of the cylindrical can 4 were set to be shorter than the radius of the cylindrical can 4, the magnetic tape having almost the same properties as those of the magnetic tape produced in Example 1 could not be produced with the substrate travel speed of 120 m/min. For example, when the distance between the center 13a of the evaporating part of the evaporation source 5a and the vertical line 12 passing across the longitudinal axis of the cylindrical can 4 was set to be 70 cm, and the distance between the center 13b of the evaporating part of the evaporation source 5b and the vertical line 12 passing across the longitudinal axis of the cylindrical can 4 was set to be 45 cm, the substrate travel speed should have be decreased to 70 m/min so as to produce the magnetic tape having almost the same recording/reproducing properties as those of the magnetic tape produced in Example 1.

In order to form the magnetic layer having the two-layered structure, only one evaporation source may be used and the shield has two openings. But, in this case, the optimization of the incident angle and the thickness of each layer was difficult so that the magnetic recording medium having excellent properties as in the present invention could not be obtained. In addition, it was impossible to increase the substrate travel speed.

EXAMPLE 3

A second Example according to the present invention is explained with reference to the vacuum deposition apparatus shown in FIG. 3.

In FIG. 3, a diameter of the cylindrical can 4 was 1.5 m, and a polyethylene terephthalate film having a thickness of 7 $\mu$m was used as the substrate 1. Co was used as the raw materials 6a, 6b and 6c. The distance B between the center 13a of the evaporation part of the evaporation source 5a and the vertical line 12 passing across the longitudinal axis of the cylindrical can 4 was 85 cm, and the distance C between the center 13b of the evaporation part of the evaporation source 5b and the vertical line 12 passing across the longitudinal axis of the cylindrical can 4 was 60 cm. The shielding plates 8a, 8b and 8c are positioned so that an incident angle between the line normal to the substrate and the direction of the vapor 7a passing through the opening 10a and impinged to the substrate was from 80° to 60° and an incident angle between the line normal to the substrate and the direction of the vapor 7b passing through the opening 10b and impinged to the substrate was from 80° to 60°. The shielding plates 8d and 8e were positioned so that an incident angle between the line normal to the substrate and the direction of the vapor 7c passing through the opening 10c and impinged to the substrate was from 30° to 50°. Oxygen was supplied from the oxygen supply nozzle 9c at the rate of 2 L/min and from each of the oxygen supply nozzles 9a and 9b at the rate of 0.5 L/min. The nonmagnetic CoO film as the under layer having a thickness of 0.02 μm and the Co-O partial oxide magnetic layer having a whole thickness of 0.12 μm and two-layered structure were formed. Thicknesses of the films formed by the vapors 7a and 7b were 0.06 μm and 0.06 μm, respectively.

The resultant medium was slid into the tapes. The recording/reproducing property of the tape was evaluated by using a ring type magnetic head comprising Sendust having a gap length of 0.15 μm. The reproduction outputs of the resultant tape were higher by 3 dB at the recording wavelength of 3.8 μm, by 7 dB at the recording wavelength of 0.54 μm and by 9 dB at the recording wavelength of 0.38 μm than a commercial Hi-8 type deposition video tape produced by the prior art method. The noise of the resultant tape was lower by about 2 dB than the commercial Hi-8 type deposition video tape. The magnetic recording tape could be produced with good reproductivity and the magnetic recording medium having the high SIN ratio could be stably produced.

The magnetic tape produced according to the method of the present invention has higher reproduction output and lower noise than the prior art deposition tape. Namely, high S/N ratio can be obtained. The productivity is high since only one travel of the substrate gives the under layer and the magnetic layer having the two-layered structure. The traveling system cf the vacuum deposition apparatus is not complex since only one cylindrical can is required for the deposition.

In the above Example, Co was used as the raw material 6c for forming the under layer. The raw material 6c is not limited to Co, and other metals and alloys, for example, Ni, Co-Ni, Co-Fe, Co-Ni-Fe, Co-Cr, Co-Ni-Cr and the like can be used for the method of the present invention insofar as the properties of the magnetic layer are improved. In the above Examples, Co was used as the raw materials 6a and 6b for forming the magnetic layer. The raw materials 6a and 6b are not limited to Co. When Co-Ni, Co-Fe, Co-Ni-Fe, Co-Cr, Co-Ni-Cr alloys and the like are used as the raw materials 6a and 6b, the same effects as in the Examples are achieved. In the case that the Co-Cr or Co-Ni-Cr alloy is used as the raw materials, the higher reproduction output can be obtained when oxygen is not supplied to the vacuum chamber.

In the above Examples, the polyethylene terephthalate film was used as the substrate. The substrate is not limited to the polyethylene terephthalate film, and includes a polymer film such as a polyimide film, a polyamide film, a polyetherimide film and a polyethylene naphthalate film, without and with the under layer.

The incident angle of the vapor to the substrate is not limited in those indicated in the above Examples.

In the above Examples, the distance B between the center 13a of the evaporation part of the evaporation source 5a and the vertical line 12 passing across the longitudinal axis of the cylindrical can 4 was 85 cm, and the distance C between the center 13b of the evaporation part of the evaporation source 5b and the vertical line 12 passing across the longitudinal axis of the cylindrical can 4 was 60 cm. The distances B and C are not limited to these values, insofar as the distance B is longer than the radius of the cylindrical can 4 and the distance C is shorter than the radius of the cylindrical can 4.

The raw materials filled in the evaporation sources 5a and 5b were the same in the above Examples, but these may be different. When the raw materials in the evaporation sources 5a and 5b are different, the optimization of the incident angle and the oxygen supply amount is necessary according to each of the raw materials.

The thickness of the magnetic layer is usually from 0.04 to 0.2 μm. The thickness of the under layer is usually from 0.005 to 0.05 μm. The under layer is preferably an oxide of a metal.

What is claimed is:

1. A method for producing a magnetic recording medium having a magnetic layer having a two-layered structure positioned on a substrate, which comprises forming the magnetic layer on the substrate by a vacuum deposition process during the travel of the substrate on a cylindrical can, wherein a first evaporation source and a second evaporation source are positioned on the same side of a vertical line passing across a longitudinal axis of the cylindrical can while confronting the cylindrical can, a shield plate having a first opening and a second opening is positioned between the cylindrical can and the first and second evaporation sources, each of vapors evaporated from the first and second evaporation sources passes through the first and second openings, respectively, a distance between the vertical line passing across the longitudinal axis of the cylindrical can and a center of an evaporation part of the first evaporation source is longer than a radius of the cylindrical can, and a distance between the vertical line passing across the longitudinal axis of the cylindrical can and a center of an evaporation part of the second evaporation source is shorter than a radius of the cylindrical can.

2. The method according to claim 1, wherein an incident angle between a line normal to the substrate and the direction of the vapor impinged on the substrate is at least 40°.

3. The method according to claim 1, wherein an angle between a line normal to a liquid surface of a raw material passing across the center of the evaporation part of the first evaporation source and a line linking the center of the evaporation part of the first evaporation source with a location in which the magnetic layer is formed by the first evaporation source is minimum at a point initiating the magnetic layer formation.

4. The method according to claim 1, wherein the deposition is conducted with supplying oxygen in a vacuum chamber, oxygen supplying nozzles are positioned near an end of the first opening and near an end of the second opening, and oxygen is injected in a direction opposite to a substrate travel direction so as to form the magnetic layer made of a partial oxide of the raw material.

5. The method according to claim 1, wherein the magnetic recording medium further has an under layer positioned between the substrate and the magnetic layer, the method comprises forming the under layer on the substrate and the magnetic layer on the under layer by a vacuum deposition process during the travel of the substrate on the cylindrical can, a third evaporation source for forming the under layer is positioned on one side, the first and second evaporation sources are positioned on another side of the vertical line passing across the longitudinal axis of the cylindrical can, a position at which the substrate initiates the contact with the cylindrical can is positioned below a deposition initiating position, and a position at which the substrate terminates the contact with the cylindrical can is positioned below a deposition terminating position.

* * * * *